United States Patent [19]

Muroki et al.

[11] 3,976,036
[45] Aug. 24, 1976

[54] ROTARY PISTON ENGINES

[75] Inventors: Takumi Muroki; Motoyuki Hayashida, both of Hiroshima, Japan

[73] Assignee: Toyo Kogyo Co., Ltd., Japan

[22] Filed: Jan. 16, 1975

[21] Appl. No.: 541,575

[30] Foreign Application Priority Data
Jan. 25, 1974   Japan................................ 49/11335

[52] U.S. Cl. .............................................. 123/8.09
[51] Int. Cl.² .......................................... F02B 53/10
[58] Field of Search.................. 123/8.09, 8.11, 8.13, 123/32 C, 32 D

[56] References Cited
UNITED STATES PATENTS

| 2,113,711 | 4/1938 | Ricardo...................... | 123/32 C UX |
| 2,379,190 | 6/1945 | Sanders...................... | 123/32 C UX |
| 3,391,677 | 7/1968 | Hejj ............................ | 123/8.09 X |
| 3,508,530 | 4/1970 | Clawson...................... | 123/8.13 X |
| 3,861,361 | 1/1975 | Klomp et al. ................ | 123/8.09 X |

FOREIGN PATENTS OR APPLICATIONS

| 1,426,039 | 4/1969 | Germany .......................... | 123/8.13 |
| 947,284 | 1/1964 | United Kingdom................ | 123/8.09 |
| 995,101 | 6/1965 | United Kingdom................ | 123/8.09 |

*Primary Examiner*—Carlton R. Croyle
*Assistant Examiner*—Michael Koczo, Jr.
*Attorney, Agent, or Firm*—Fleit & Jacobson

[57] ABSTRACT

A rotary piston type internal combustion engine comprising a casing which includes a rotor housing having cavity defined by a trochoidal inner peripheral wall having a major and a minor axes, and a pair of side housings sealingly secured to the opposite sides of the rotor housing, a substantially polygonal rotor disposed in said cavity for rotation with apices in sliding contact with the inner peripheral wall of the rotor housing to define working chambers of variable volume with the trochoidal inner peripheral wall of the casing, said casing having an air intake port and an exhaust port, a primary combustion chamber disposed outside the cavity in the casing, a communication passage connecting the primary combustion chamber with the cavity in the casing, a fuel injection nozzle provided in said primary combustion chamber, and an ignition plug provided in said primary combustion chamber, said primary combustion chamber having a volume which is 35 to 65 percent of the sum of volume of the primary combustion chamber and that of one of the working chambers in the most compressed position, said communication passage opening to the casing cavity at a position between 15° before and 30° after the minor axis of the rotor housing, said fuel nozzle being adapted to provide air-fuel mixture having air-fuel ratio of 10 to 16 in the primary combustion chamber and overall air-fuel ratio of 19 to 46 in the primary combustion chamber and the working chamber communicating therewith.

5 Claims, 3 Drawing Figures

ROTARY PISTON ENGINES

The present invention relates to rotary piston type internal combustion engines and more particularly to rotary piston engines of such type that have a primary combustion chamber communicating through passage means with a cavity in rotor casing.

Conventionally, in rotary piston type engines, in order to eliminate or substantially decrease noxious constituents such as CO, HC and $NO_x$ in engine exhaust gas, there has already been proposed to provide a primary combustion chamber outside the cavity of a casing, preferably in the vicinity of minor axis of the casing cavity, said primary combustion chamber being connected through communication passage means with the cavity in the casing and provided with fuel injection means and ignition means. Fresh air is taken into working chambers and thereafter introduced through communication passage means into the primary combustion chamber where the air is mixed with fuel injected from the fuel injection means to provide combustible fuel-air mixture which is then ignited by the ignition means. Usually, the primary combustion chamber is designed to possess minimum surface-to-volume ratio (S/V) and combustion of the mixture mainly takes place in the primary combustion chamber, so that it is possible to obtain a relatively high combustion efficiency. Thus, the conventional arrangement is effective to decrease the amount of CO and HC in the engine exhaust gas, however, there has been unsolvable problem that the amount of $NO_x$ is adversely increased. Thus, it has been desired to provide effective means for simultaneously decreasing the amount of $NO_x$ as well as CO and HC.

The present invention has an object to eliminate the aforementioned problems of prior art.

More specific object of the present invention is to provide novel combination of primary combustion chamber and working chambers, which can decrease the amount of $NO_x$ as well as CO and HC in rotary piston engine exhaust gas.

A further object of the present invention is to solve the aforementioned problem through improvements in primary combustion in the primary combustion chambers and secondary combustion in the working chambers.

According to the present invention, in order to accomplish the above and other objects, the communication passage means between the primary combustion chamber and the casing cavity is opened to the cavity at such a location that combustion gas containing substantial amount of CO and HC is retained in the primary combustion chamber as much as possible when an apex portion of the rotor passes across the opening of the communication passage, so that production of $NO_x$ can be suppressed to minimum. Further, average fuel-to-air ratio of the mixture in the primary combustion chamber and the working chambers is determined to a value substantially greater than theoretical air-fuel ratio, although it may vary in accordance with the ratio of volumes of the working and the primary combustion chambers, and the air-fuel ratio in the primary combustion chamber. This is effective to obtain improved secondary combustion in the working chambers and residual unburnt constituents are minimized. For the purposes, the opening of the communication passage is located in the area between 15° before and 30° after the minor axis of the casing cavity as measured from the center of the cavity. Further, the primary combustion chamber has a volume of 35 to 65 percent of the sum of minimum volume of a working chamber and the volume of the primary combustion chamber. The effective range of air-fuel ratio in the primary combustion chamber is between 10 and 16 and the average value of air-fuel ratio of the mixture in the working chambers and the primary combustion chamber is between 19 and 46.

In rotary piston engines having a primary combustion chamber communicating through a passage with a cavity in the casing, combustible mixture is ignited in the primary combustion chamber to be burnt therein and the resultant combustion gas is discharged into a working chamber which is in communication with the primary combustion chamber. Normally, such a discharge of the combustion gas into the working chamber occurs when the working chamber is in the most compressed position where the communication passage between the primary combustion chamber and the working chamber opens to the latter at substantially the central position thereof. This arrangement is disadvantageous in that only such air that is in the part of the working chamber at the trailing side of the communication passage can be effectively utilized for secondary combustion. If the average air-fuel ratio of the mixture in the working chamber and the primary combustion chamber is close to the theoretical ratio, there will thus be shortage of air in the working chamber for the secondary combustion therein, resulting in increase in residual CO and HC.

In view of this problem, the present invention proposes to substantially increase the average air-fuel ratio in relation to the theoretical ratio as previously mentioned so that the secondary combustion in the working chamber is facilitated.

The above and other objects and features of the present invention will become apparent from the following descriptions of a preferred embodiment taking reference to the accompanying drawings, in which.

Figure 1:
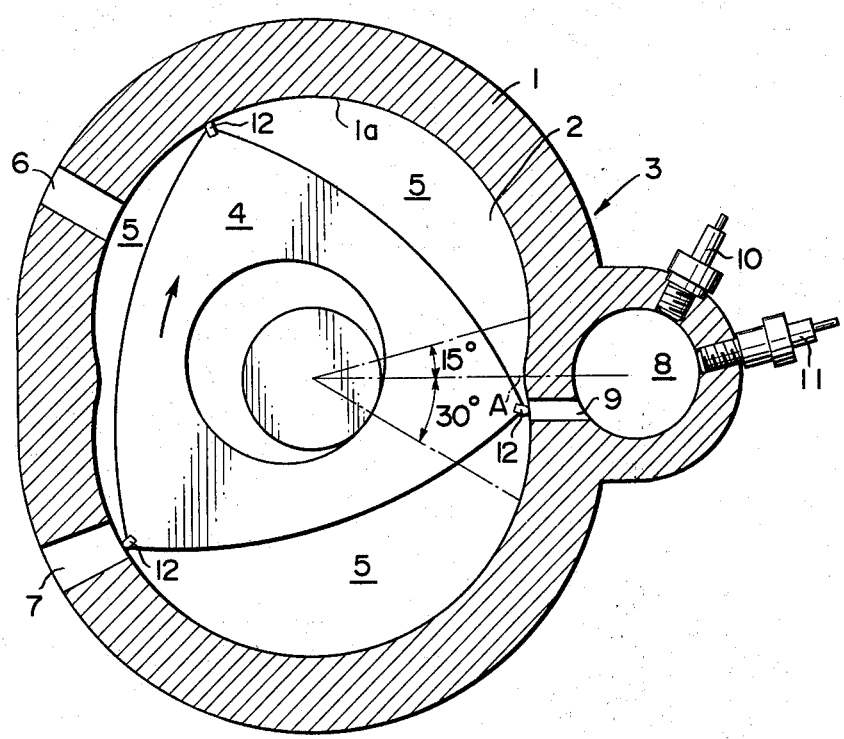
FIG. 1 is a sectional view of a rotary piston type engine in accordance with one embodiment of the present invention.

Referring now to the drawings, particularly to FIG. 1, there is shown a rotary piston engine comprising a casing 3 constituted by a rotor housing 1 and a pair of side housings 2 secured to the opposite sides thereof. The rotor housing 1 has a trochoidal inner wall 1a to define a cavity in which a substantially triangular rotor 4 is disposed for rotation with apex portions adjacent to the inner wall 1a. The rotor 4 is provided at its apex portions with apex seals 12 which slidably engage the inner wall 1a of the rotor housing 1 so that working chambers 5 of variable volume are defined in the cavity. As well known in the art, the rotor housing 1 is provided with an intake port 6 and an exhaust port 7. Further, the rotor housing 1 is provided, at the side opposite to the side where the intake and exhaust ports are provided, with a primary combustion chamber 8 which communicates through a passage 9 with the cavity in the casing. The primary combustion chamber 8 is preferably of a spherical configuration and provided with an ignition plug 10 and a fuel injection nozzle 11.

In operation, air or fuel lean mixture is taken into the working chamber 5 through the intake passage 6. As the rotor 4 rotates as shown by an arrow in FIG. 1, the intake air or fuel-air mixture is compressed and a part of the air or mixture is introduced through the passage 9 into the primary combustion chamber 8 as the working chamber 5 communicates with the passage 9. Fuel is injected through the nozzle 11 into the chamber 8 to form fuel rich combustible mixture therein. The mixture is then ignited by the ignition plug 10 and primary combustion takes place in the primary combustion chamber 8. The resultant combustion gas in the chamber 8 is then passed through the passage 9 into the working chamber 5 communicating with the primary combustion chamber 8 and secondary combustion takes place in the working chamber 5.

In the illustrated rotary piston engine, the primary combustion chamber 8 is of a volume which is 35 to 65% of the sum of the volume of the primary combustion chamber and that of the working chamber 5 in the most compressed position. The volume ratio is so determined that satisfactory engine output can be obtained. With the volume ratio beyond or below the above range, the compression ratio of the engine is decreased or combustion energy produced in the primary combustion chamber becomes insufficient so that the output of the engine is decreased to an unacceptable level. It has been found that, with the volume ratio of about 50%, the most preferable result can be obtained. This fact can be considered as a proof that the primary combustion chamber in the illustrated engine is clearly distinguishable from the subsidiary or precombustion chamber of a torch type engine. More precisely, the primary combustion chamber 8 is expected to produce substantial part of the combustion gas pressure which is utilized to drive the rotor 4, while the working chamber 5 serves to convey intake air under compression into the primary combustion chamber 8 and also to receive combustion gas from the primary combustion chamber 8 and mix it with the air remaining therein so that further or secondary combustion takes place.

The communication passage 9 between the primary combustion chamber 8 and the cavity in the rotor housing 1 is offset from the center of the chamber 8 as shown in FIG. 1 and the passage 9 opens to the cavity at a position between 15° before and 30° after the minor axis of the casing 3. With the communication passage 9 opening to the casing cavity in the aforementioned angular range, each of the apex seals 12 can pass across the opening of the passage 9 when there is minimum pressure difference between the leading side working chamber 5 which is in the expansion stroke, the trailing side working chamber 5 which is in the compression stroke and the primary combustion chamber 8, and also when there is substantial pressure in the primary combustion chamber 8. Thus, with this arrangement, substantial amount of combustion gas is retained in the chamber 8 at this stage of operation, with the result that the primary combustion in the chamber 8 takes place with slower speed and the production of $NO_x$ can be remarkably suppressed. It has been found that the most preferable position of the communication passage 9 is 5° after the minor axis of the casing, where the pressures in the leading side working chamber 5, in the trailing side working chamber 5 and in the primary combustion chamber 8 become substantially the same with each other. In this particular position of the communication passage 9, each of the apex seals 12 on the rotor 4 passes across the opening of the passage 9 when the leading part of the leading side working chamber 5 is connected with the exhaust port 7 and the pressure of the combustion gas therein starts to decrease.

Figure 2:
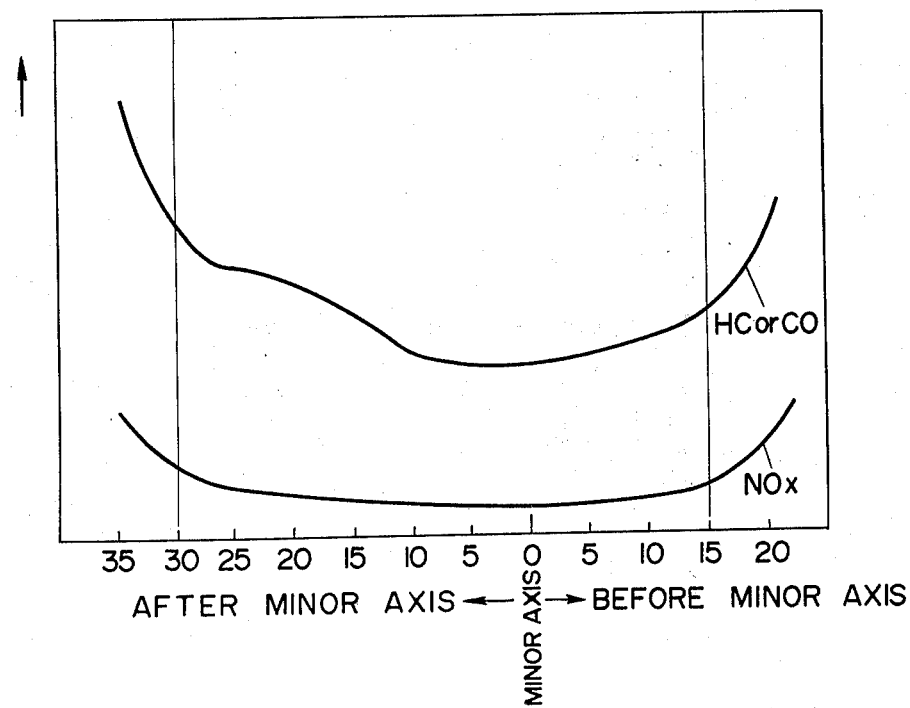
FIG. 2 is a diagram showing changes in amount of noxious constituents in engine exhaust gas in accordance with change in the position of opening of the communication passage between the primary combustion chamber and the casing cavity.

As shown in FIG. 2, the amount of $NO_x$ in the engine exhaust gas is minimum with the communication passage 9 opening to the casing cavity at 5° after the minor axis. As the position of the opening of the passage 9 is displaced toward the leading side, the time interval in which the passage 9 is in communication with the exhausting working chamber 5 is prolonged so that increased amount of combustion gas in the primary combustion chamber 8 is exhausted through the exhausting working chamber 5. As the position of the opening of the passage 9 is displaced toward the trailing side, the primary combustion chamber 8 is brought into communication with the compressing working chamber 5 when the air in the chamber 5 is not sufficiently compressed, so that increased amount of combustion gas is allowed to flow from the primary combustion chamber 8 into the compressing working chamber 5. In either of the cases, combustion in the chamber 8 is facilitated due to improved scavenging effect therein so that production of $NO_x$ is adversely increased. As shown in FIG. 2, the allowable range of the location of the passage 9 is between 15° before and 30° after the minor axis of the casing 3. With the communication passage 9 opening to the casing cavity beyond the above range, the amount of $NO_x$ remarkably increases. Further, since the combustion gas in the primary combustion chamber 8 contains substantial amount of HC and CO, there will be an increase in the amount of HC and CO in the engine exhaust gas if an increased amount of combustion gas is allowed to flow from the primary combustion chamber 8 into the exhausting working chamber 5.

According to a further feature of the present invention, the air-fuel ratio of the mixture in the primary combustion chamber 8 is between 10 and 16, preferably between 11 and 15, and the overall air-fuel ratio of the mixture in the primary combustion chamber 8 and the working chamber 5 communicating therewith is between 19 and 46. The overall air-fuel ratio may be determined within the range in accordance with the volume ratio, that is, the ratio of the volume of the primary combustion chamber 8 and the sum of the volume of the chamber 8 and that of the working chamber 5 in most compressed position. The above range of the mixing ratio in the primary combustion chamber 8 is determined so that ignition of the air-fuel mixture takes place without fail. If the mixing ratio in the chamber 8 is out of the aforementioned range, there will often be failure of ignition by the plug 10 resulting in rough engine operation.

In conventional engines, since the scavenging effect is better than in the engines of the present invention, the mixing ratio may be slightly out of the range, however, in accordance with the present invention, the scavenging effect of the primary combustion chamber 8 is intentionally decreased by positioning the communication passage 9 in the aforementioned particular location in order to suppress the production of $NO_x$, so that the permissible range of the air-fuel mixture ratio in the precombustion chamber 8 is narrower than in conventional engines.

The overall air-fuel ratio is determined by the volume ratio of the primary combustion chamber 8 and the air-fuel ratio of the mixture in the primary combustion chamber 8. With the volume ratio of 65%, the air-fuel ratio in the primary combustion chamber 8 of 10 to 16 will yield an overall air-fuel ratio of 15 to 25 while when the volume ratio is 35% the overall air-fuel ratio will be 28 to 46. Thus, when the volume ratio is determined between 35 and 65 percent, the air-fuel ratio in the primary combustion chamber 8 of 10 to 16 will yield the overall air-fuel ratio of 15 to 46. However, in accordance with the present invention, the overall air-fuel ratio is limited above 19 in order to ensure effective secondary combustion in the working chamber 5.

Figure 3:
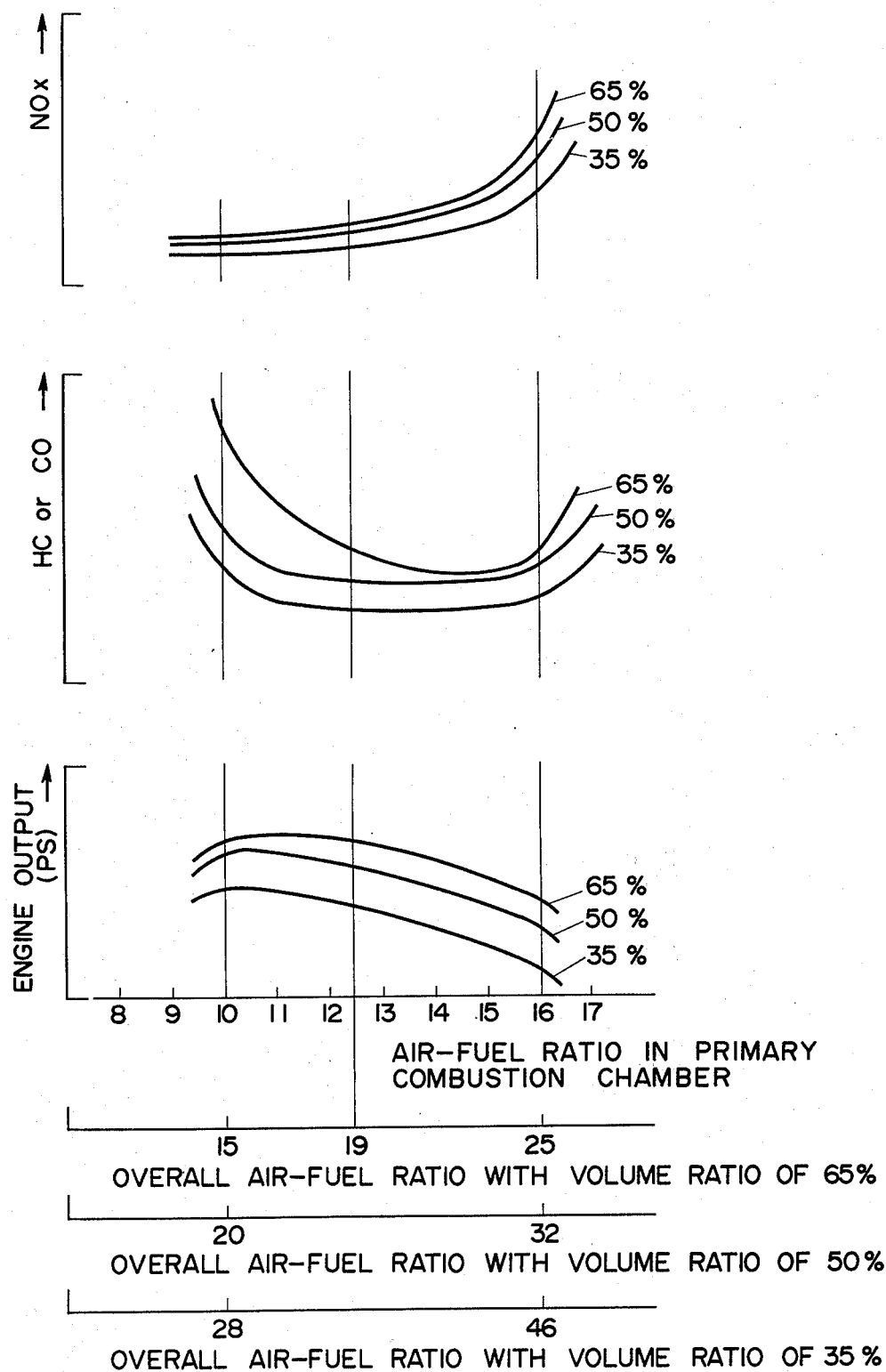
FIG. 3 is a diagram showing the relationship between the air-fuel ratio in the primary combustion chamber and $NO_x$, HC and the engine output.

Referring now to FIG. 3 which shows changes in the amounts of $NO_x$ and HC (or CO) in the engine exhaust gas and the engine output in response to changes in the air-fuel ratio in the primary combustion chamber 8, the overall air-fuel ratio and the volume ratio, it will be seen that, with the volume ratio of 35 to 50%, the overall air-fuel ratio is between 28 and 46, and between 20 and 32, respectively, as far as the air-fuel ratio in the primary combustion chamber 8 is in the aforementioned allowable range, so that effective secondary combustion takes place in the working chamber 5 whereby the amount of HC or CO in the engine exhaust gas can be maintained at a lower level. However, if the volume ratio is 65%, the overall air-fuel ratio range becomes 15 to 25 and there will be substantial increase in the amount of HC or CO with the overall ratio of 19 or below due to insufficient secondary combustion. Further, it will also be seen in FIG. 3 that there is remarkable increase in the amount of HC and CO and remarkable decrease in the engine output with the air-fuel ratio exceeding the allowable range, because there will often be ignition failure in the primary combustion chamber 8. Thus, it is important in the present invention to limit the overall air-fuel ratio above 19 which is substantially greater than the theoretical air-fuel ratio.

Thus, according to the present invention, air-fuel mixture having mixing ratio of 10 to 16 is formed in the primary combustion chamber 8 and ignited without fail by the ignition plug 10 so that primary combustion takes place in the chamber 8. The particular location of the opening of the communication passage 9 to the casing cavity serves to prevent the combustion gas in the chamber 8 from flowing into the exhausting working chamber 5 when one of the apex seals 12 pass across the opening of the passage 9. Thus, on one hand unburnt noxious constitutents in the chamber 8 is prevented from being discharged into atmosphere through the exhausting working chamber 5 and, on the other hand, increased amount of combustion gas is retained in the chamber 8 so as to retard the primary combustion therein. This is particularly effective to suppress the production of $NO_x$ during the primary combustion. The combustion gas thus produced in the primary combustion chamber contains less amount of $NO_x$, however, it may contain appreciable amount of unburnt noxious constituents such as HC and CO. The combustion gas in the chamber 8 is discharged into the compressing working chamber 5 and secondary combustion takes place therein. Since the overall air-fuel ratio is limited above 19, the amount of HC and CO can be substantially decreased as previously described. The invention is thus effective to substantially decrease the amount of noxious constituents such as $NO_x$, HC and CO in the engine exhaust gas. Further, since both the primary combustion and the secondary combustion can contribute to engine output, fuel comsumption of the engine can also be improved.

The invention has thus been shown and described with reference to specific embodiment, however, the invention is in no way limited to the details of the illustrated structures but changes and modifications may be made without departing from the scope of the appended claims. For example, the working chambers 5 may be supplied with fuel for the purpose of obtaining high engine output or improving cold starting property of the engine. Further, during deceleration, supply of fuel to the primary combustion chamber 8 may be interrupted in order to save fuel. In those cases, the overall air-fuel ratio and the air-fuel ratio in the primary combustion chamber 8 may momentarily become out of the aforementioned allowable range. Therefore, it should be contemplated that the invention is broad enough to cover such modifications as far as the concepts of the invention is basically employed.

We claim:

1. A rotary piston type internal combustion engine comprising a casing which includes a rotor housing having cavity defined by a trochoidal inner peripheral wall having a major and a minor axis, and a pair of side housings sealingly secured to the opposite sides of the rotor housing, a substantially polygonal rotor disposed in said cavity for rotation with apices in sliding contact with the inner peripheral wall of the rotor housing to define working chambers of variable volume with the trochoidal inner peripheral wall of the casing, said casing having air intake port means and exhaust port means, primary combustion chamber means disposed outside the cavity in the casing, communication passage means connecting the primary combustion chamber means with the cavity in the casing, means for supplying fuel to said primary combustion chamber means, and ignition means provided in said primary combustion chamber means, said primary combustion chamber means having a volume which is 35 to 65 percent of the sum of volume of the primary combustion chamber and that of one of the working chambers in the most compressed position, said communication passage opening to the casing cavity at a position between 15° before and 30° after the minor axis of the rotor housing, said fuel supply means being adapted to provide air-fuel mixture having air-fuel ratio of 10 to 16 in the primary combustion chamber and overall air-fuel ratio of 19 to 46 in the primary combustion chamber and the working chamber communicating therewith.

2. A rotary piston type engine in accordance with claim 1 in which said communication passage opens to the casing cavity at 5° after the minor axis.

3. A rotary piston type engine in accordance with claim 1 in which said primary combustion chamber is of a substantially spherical configuration.

4. A rotary piston type engine in accordance with claim 3 in which said communication passage means is offset from the center of the sphere of the primary combustion chamber.

5. A rotary piston type engine in accordance with claim 1 in which said primary combustion chamber has a volume which is approximately 50 percent of the sum of volume of the primary combustion chamber and that of one of the working chambers in the most compressed position.

* * * * *